(12) United States Patent
Jamison

(10) Patent No.: US 9,146,837 B2
(45) Date of Patent: Sep. 29, 2015

(54) AUTOMATED BUILD, DEPLOY, AND TESTING ENVIRONMENT FOR FIRMWARE

(75) Inventor: Shawn Jamison, Snellville, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 594 days.

(21) Appl. No.: 13/478,631

(22) Filed: May 23, 2012

(65) Prior Publication Data

US 2013/0318397 A1 Nov. 28, 2013

(51) Int. Cl.
*G06F 19/00* (2011.01)
*G06F 11/36* (2006.01)
*G06F 9/445* (2006.01)

(52) U.S. Cl.
CPC .............. *G06F 11/3664* (2013.01); *G06F 8/63* (2013.01)

(58) Field of Classification Search
CPC .................................................. G06F 11/3664
USPC ............................................. 702/123; 714/32
See application file for complete search history.

(56) References Cited

U.S. PATENT DOCUMENTS

| 3,899,639 | A | * | 8/1975 | Cleveley et al. ........... 379/92.03 |
| 5,473,322 | A | * | 12/1995 | Carney ..................... 340/870.02 |
| 7,801,154 | B2 | * | 9/2010 | Schrock ................... 370/395.53 |
| 8,490,084 | B1 | * | 7/2013 | Alford et al. ................... 717/177 |
| 2004/0267485 | A1 | * | 12/2004 | Penov et al. ..................... 702/119 |
| 2005/0044533 | A1 | * | 2/2005 | Nesbit et al. ................... 717/124 |
| 2005/0086022 | A1 | * | 4/2005 | Lindberg et al. ............... 702/123 |
| 2009/0292952 | A1 | * | 11/2009 | Merry ............................. 714/38 |
| 2011/0035629 | A1 | * | 2/2011 | Noller et al. ............... 714/38.14 |

* cited by examiner

*Primary Examiner* — Janet Suglo
*Assistant Examiner* — Stephanie Bloss
(74) *Attorney, Agent, or Firm* — Kilpatrick Townsend & Stockton LLP

(57) ABSTRACT

Systems and methods for automating the building, deployment, and testing of firmware are disclosed. An exemplary system includes a build-deploy-testing environment. The build-deploy-testing environment can access a hardware testing profile that includes hardware specifications for a test server, an operating system for a test server, an application for the test server to communicate with a test device, and a plurality of inputs for installing the operating system and the application on the test server. The build-deploy-testing environment can generate a firmware module compatible with a test device and a testing environment module for a test server based on the hardware testing profile. The build-deploy-testing environment can deploy the testing environment module to a test server and deploy the firmware module to a test device. The build-deploy-testing environment can execute a testing application to determine the compatibility of the firmware with the test device in communication with the test server.

20 Claims, 4 Drawing Sheets

AUTOMATED BUILD, DEPLOY, AND TESTING ENVIRONMENT FOR FIRMWARE

TECHNICAL FIELD

This disclosure relates generally to computer software and more particularly relates to automating the building, deployment, and testing of firmware.

BACKGROUND

Hardware devices operating in complex data networks, such as utility meters of a power distribution network, can be designed to have operating life spans of up to 15-20 years. As new devices and functions are introduced into the data network, the firmware installed on existing devices in the data network can be updated to maintain the compatibility of the existing devices with the data network.

Development of firmware can involve extensive time spent on building the environment in which the firmware is to be tested, deploying the firmware to the testing environment, and testing the firmware. Prior solutions for developing firmware can include a developer receiving a request for a firmware version for a device (i.e. a "firmware build"). The developer generates a software image that can include the firmware build and an application executed by the target device. The software image is manually installed (i.e., "deployed") onto the target device. Testing tools or other utilities are used to perform manual testing of the firmware build deployed to the target device. For example, to test a new firmware module for a utility meter of a power distribution network, an operator can configure a physical test server environment, install firmware on test meters in communication with the test server environment, and perform manual testing of the firmware installed on the test meters. In complex systems involving a large number of target devices, the development, deployment, and testing of a firmware build can have a duration of days or weeks, thereby decreasing the efficiency of developing new firmware builds and increasing the cost associated with upgrading firmware builds.

Accordingly, systems and methods are desirable for reducing the time involved in a successful execution of the build-deploy-test cycle.

SUMMARY

Systems and methods are disclosed for automating the building, deployment, and testing of firmware. An exemplary system includes a build-deploy-testing environment. The build-deploy-testing environment is configured to access a hardware testing profile stored on a computer readable medium. A hardware testing profile can include one or more files specifying hardware specifications associated with a test server, an operating system for a test server, an application for the test server to communicate with a test device, and a plurality of inputs to the test server for installing the operating system and the application on the test server. The build-deploy-testing environment is further configured to generate, based on the hardware testing profile, a firmware module compatible with a test device and a testing environment module for a test server. The build-deploy-testing environment is further configured to deploy the testing environment module to a test server. The build-deploy-testing environment is further configured to deploy the firmware module to a test device. The build-deploy-testing environment is further configured to execute a testing application configured to determine the compatibility of the firmware with the test device in communication with the test server having the testing environment module.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
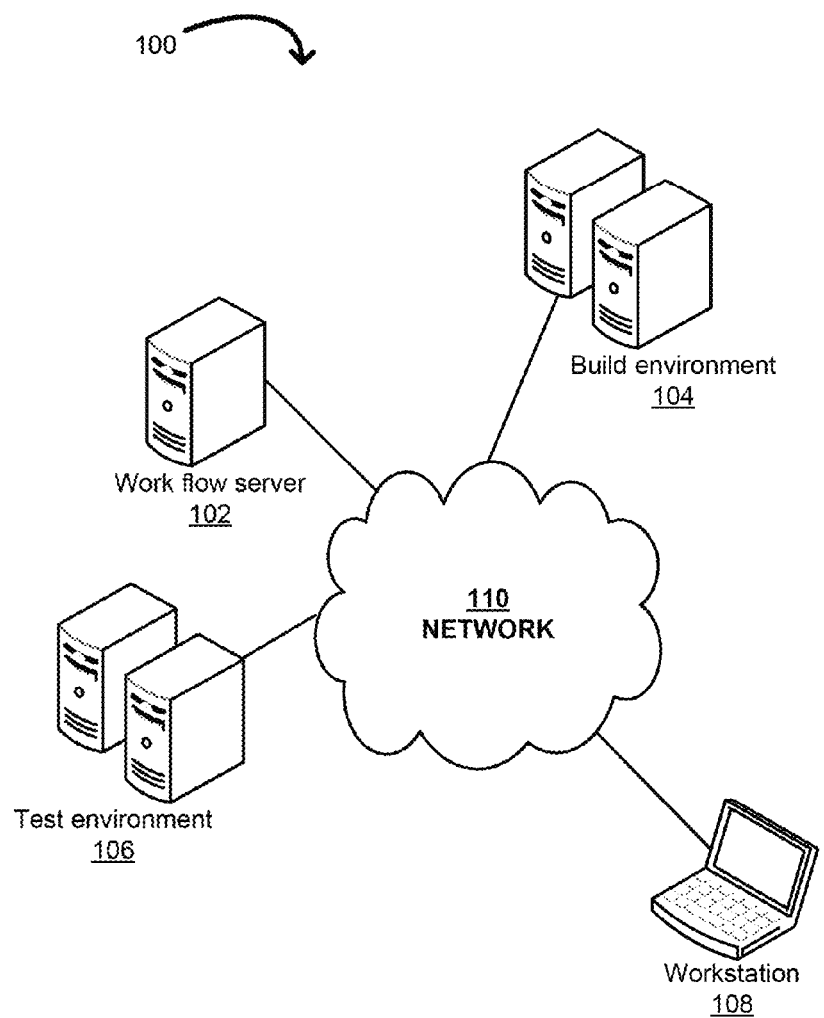
FIG. 1 is a network diagram illustrating an exemplary build-deploy-testing environment.

Systems and methods are provided for automating the building, deployment, and testing of firmware modules. The systems and methods can select a hardware testing profile for testing a device. An example of such a hardware testing profile for testing a device can include a file having hardware and software specifications for a server in communication with a test device, such as utility meter or other device, via a data network. A firmware module can be automatically created ("or built") for the test device based on the specifications of the hardware testing profile. A testing environment module can be automatically built for a test server based on the specifications of the hardware testing profile. The firmware module can be deployed automatically to the test device. The testing environment module can be deployed automatically to a test server. In response to the deployment of the testing environment module and the firmware module, a testing application executed on a development server can execute a series of tests on the test device with the updated firmware module operating in communication with the test server having the testing environment. Automating the building, deployment, and testing of a firmware module can reduce or eliminate manual intervention in the build-deploy-test cycle, thereby reducing the duration of the build-deploy-test cycle from a matter of weeks to a matter of hours.

As used herein, the term "firmware" is used to refer to one or more operating instructions for controlling one or more hardware components of a device. Firmware can include software embedded on a hardware device. A firmware module or program can communicate directly with a hardware component without interacting with the hardware component via an operating system of the hardware device.

An exemplary system can include a build-deploy-testing environment. The build-deploy-testing environment can include one or more servers executing the automated build, test, and deploy cycle. The build-deploy-testing environment can access a hardware testing profile stored on a computer readable medium. The build-deploy-testing environment can generate a firmware module and a testing environment module based on the hardware testing profile. The build-deploy-testing environment can automatically deploy the testing environment module to a test server. The build-deploy-testing environment can automatically deploy the firmware module to a test device. In some aspects, the build-deploy-testing environment can include one or more test devices communicating with one or more servers via a data network. The one or more test devices can be configured to receive firmware and other software updates via the data network. Deploying the firmware module to a test device can include deploying the firmware module via a data network. Deploying the firmware module to the test device can also include storing the firmware module to a read-only memory unit of the test device.

A hardware testing profile can specify one or more hardware specifications for a test server, an operating system for a test server, an application for the test server to communicate with a test device, and a plurality of inputs to the test server for installing the operating system and the application on the test server. Examples of hardware specifications can include (but are not limited to) a memory capacity for a test server, a storage capacity for a test server, and a processing capability for a test server. An example of an application can include one or more software modules configured to communicate with a plurality of network devices via a data network, such as utility meters in a power line communication ("PLC") network.

A testing environment module can include one or more executable files including the operating system, the application, and the inputs for installing the testing environment module on a test server.

In additional or alternative aspects, deploying the testing environment module to the test server can include determining that the test server satisfies the one or more hardware specifications, installing the operating system on the test server, and installing the application on the test server.

In additional or alternative aspects, a test server can be a virtual server. As used herein, the term "virtual server" is used to refer to a software implementation of a server that can execute programs and otherwise respond in the same manner as a hardware implementation of a server. For example, a virtual server can include an emulation of a first server having an operating system, memory capability, and processing capability on a second server having a different operating system, memory capability, and/or processing capability. Deploying a testing environment module to a virtual test server can include emulating a test server satisfying the one or more hardware specifications and having the operating system and the application.

The test device can include any device having an integrated network device. Examples of test devices can include (but are not limited to) utility meters in a PLC network, a mesh network, or other data networks.

As used herein, the term "network device" is used to refer to any device capable of communicating with other devices via a data network.

As used herein, the term "data network" is used to refer to a group of devices interconnected by communication channels that allow sharing of information. A communication channel can include any suitable means for communicating data over network, such as (but not limited to) a copper cable, a fiber optic cable, a wireless transmission, etc.

The build-deploy-testing environment can execute a testing application configured to determine the compatibility of the firmware with the test device in communication with the test server having the testing environment module. The testing application can be executed by a server or other computing system in communication with the test server and the test device.

Executing the testing application can include executing smoke tests for the test device. Smoke tests can include tests of the functionality of features included in both the firmware module and a different or previous firmware module for the test device. Smoke tests can determine that the firmware module has not degraded or otherwise disrupted the use of features or functions from a different or previous firmware module for the test device. For example, a test device such as a utility meter having a first firmware module may include a feature such as communicating with a test server via an Ethernet data network. A second firmware module can be deployed to the test device via the build-deploy-testing environment. A successful smoke test of the test device having the second firmware module can include the test device being able to communicate with a test server via the Ethernet data network in the same manner as the test device having the first firmware module.

In additional or alternative aspects, the build-deploy-testing environment can capture a hardware testing profile. Capturing a hardware testing profile can include receiving inputs associated with the hardware testing profile. The inputs can include any interaction with a test server via an input/output interface. For example, the build-deploy-testing environment can monitor a test server satisfying a set of hardware specification as an operator installs the operating system and the application to the test server. The build-deploy-testing environment can store data representing the inputs to a computer-readable medium. The build-deploy-testing environment can generate the hardware testing profile from the data representing the plurality of inputs.

These illustrative examples are given to introduce the reader to the general subject matter discussed here and are not intended to limit the scope of the disclosed concepts. The following sections describe various additional aspects and examples with reference to the drawings in which like numerals indicate like elements.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Referring now to the drawings, FIG. 1 is a network diagram illustrating an exemplary build-deploy-testing environment 100. The build-deploy-testing environment 100 can include a workflow server 102, a build environment 104, and a testing environment 106. A workstation 108 can access the build-deploy-testing environment 100 via a network 110. Although FIG. 1 depicts the workflow server 102, the build environment 104, and the testing environment 106 as separate systems, other implementations are possible. For example, a single computing system can include one or more software modules configured to provide the features of the workflow server 102, the build environment 104, and/or the testing environment 106 as described below.

The workflow server 102 can include one or more servers. Examples of a workflow server 102 can include (but are not limited to) a single computing system, a cloud computing system, a grid computing system, etc. The workflow server 102 can control execution of the build-deploy-test cycle in build-deploy-testing environment 100. The workflow server 102 can receive a request to develop a firmware module for a test device from the workstation 108 via the network 110. The workflow server 102 can communicate a command to the build environment 104 via the network 110 to build the network.

The workflow server 102, the build environment 104, and the testing environment 106 can include servers having one or more development applications. The development applications can provide automation and integration of processes between multiple developers working on a common project, such as the build-deploy-test cycle for firmware. The workflow server 102 can include or access a data storage device providing access to one or more files for the common project. The one or more collaboration applications can include, for example, customized applications or one or more aspects of a commercial development environment, such as (but not limited to) Microsoft® Visual Studio Team Foundation Server® and Microsoft® Test Manager®.

The build environment 104 can include one or more servers. Examples of a build environment 104 can include (but are not limited to) a single computing system, a cloud computing system, a grid computing system, etc. The build environment 104 can develop a software image for a test device. The software image can include a firmware module to be deployed onto the test device. The firmware module can be developed for testing with a specified hardware testing profile. The hardware testing profile can be stored in a library of hardware testing profiles stored on a computer-readable medium included in or otherwise accessible by the build environment 104. Each of the hardware testing profiles can include or specify one or more hardware specifications associated with a test server, an operating system for a test server, an application for the test server to communicate with a test device, and a plurality of inputs to the test server for installing the operating system and the application on the test server. The build environment 104 can also include a testing environment module in the software image.

The build environment 104 can compile the firmware module to verify that the firmware module can be installed on a test server. The build environment 104 can also perform unit tests on the firmware module. Unit tests can include testing of functions of the firmware module. An example of a unit test can include a function test for determining whether a function included in the source code of a firmware module can accept a given set of parameters and return a given set of results. The build environment 104 can provide a test input to one or more functions include in the firmware module to verify that the output of each function is correct.

The build environment 104 can provide the software image including the firmware module and the testing environment module used to develop the firmware module to the workflow server 102. The workflow server 102 can deploy the software image including the firmware module and testing environment module to the testing environment 106. Some aspects can include the workflow server 102 configuring applications installed on a server in the test environment 106 to deploy the software image to test devices included in the test environment 106.

Figure 2:
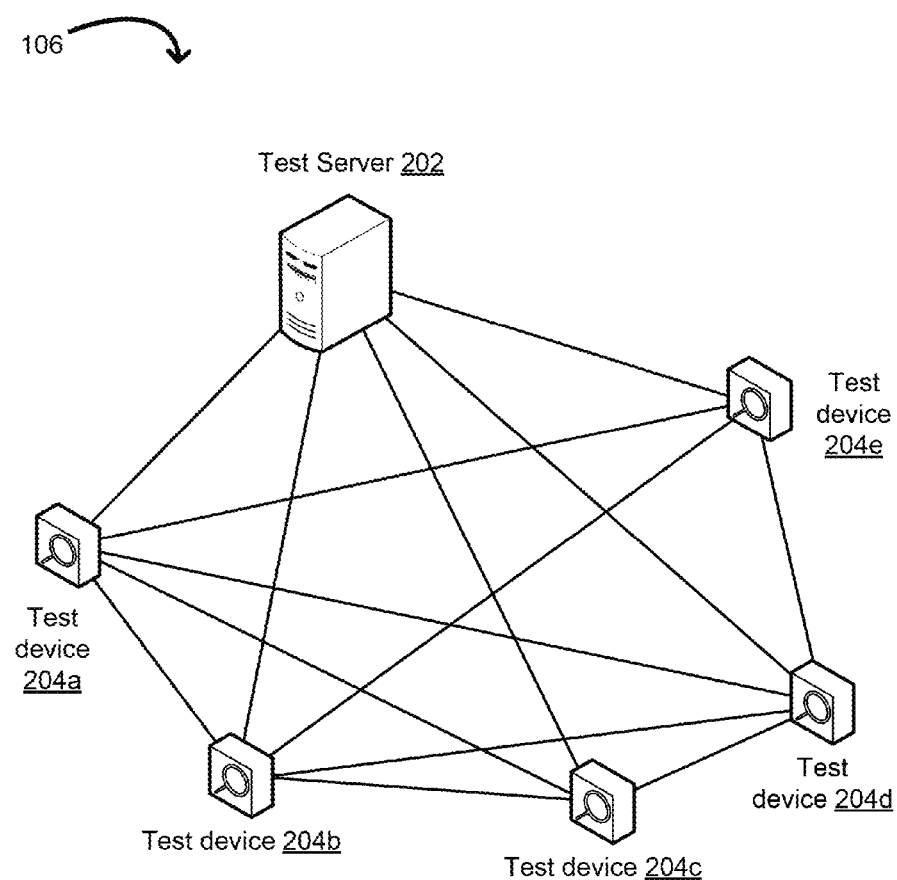
FIG. 2 is a network diagram illustrating an exemplary testing environment having a test server in communication with test devices.

The testing environment 106 can include one or more test server 202 and one or more test devices. FIG. 2 is a network diagram illustrating an exemplary testing environment 106 having a test server 202 in communication with test devices 204a-e.

The testing environment 106 can include a data network providing communication channels among the test server 202 and the test devices 204a-e. A communication channel can include any suitable means capable of communicating signals among the test devices 204a-e and the test server 202. Examples of suitable communication media include (but are not limited to), Ethernet cable, wireless data communication, power cables for use in power line communication ("PLC"), etc. Power line communication can include communicating signals via cables used for providing electric power from a utility company to buildings in a geographic area. In additional or alternative aspects, a data network using a first type of communication media, such as an Ethernet cable network or a wireless data communication network can be configured to emulate a data network using a second type of communication media, such as a PLC network.

An example of a testing environment 106 can include a first test server with a controller application for managing the test devices and a second test server with a collector application for collecting data from the test devices. The controller application executed at the first test server can communicate via an Ethernet data network with the collector application executed at the second test server. The second test server having the collector application can wirelessly communicate with the test devices. The test devices can include utility meters.

The testing environment 106 can be configured using any suitable network topology. For example, the testing environment 106 can be a mesh network. A testing environment 106 that is a mesh network can include each of the test devices 204a-e being configured to relay data received from other network devices, such that the test devices 204a-e collaborate to propagate the data through the testing environment 106. Other suitable network topologies can include (but are not limited to), a ring network, a star network, a bus network, etc. The testing environment 106 can also be configured to emulate a network topology different from the physical network topology of the testing environment.

The test server 202 of the testing environment 106 can be configured to collect and process data from the test devices 204a-e. The test devices 204a-e can include any device having an integrated network device for communicating via a data network. Examples of the test devices 204a-e can include (but are not limited to) utility meters for use in a PLC network emulated by the data network of the test environment 106. The test server 202 can communicate data to each of the test devices 204a-e. The test server 202 can remotely configure the test devices 204a-e via control signals communicated with the data.

The test devices 204a-e can include any device communicating data via the testing environment 106. Each of the test devices 204a-e can include one or more hardware components for physically interfacing with the testing environment 106, such as (but not limited to) a network interface controller. Each of the test devices 204a-e can include a computer readable medium or other suitable memory device. Each of the test devices 204a-e can include a processor configured to execute software instructions stored in the computer readable medium. The software instructions at each of the test devices 204a-e can include instructions for encrypting and decrypting data communicated via the testing environment 106. The test devices 204a-e can be configured to receive firmware and other software updates via a data network, such as the network 110.

Although FIG. 2 depicts a testing environment 106 having a single test server 202 and five test devices 204a-e, any number of network controllers and/or network devices can be used.

In an exemplary build-deploy-testing environment 100, a testing environment 106 can be or can emulate a PLC network, a test server 202 can include a command center application, and each of the test devices 204a-e can be a utility meter. The test server 202 can provide test commands to each utility meter simulating the operation of the utility meter in a utility network, such as a power distribution network. Each utility meter can be configured to record data describing the consumption of electrical power at a geographic location of the utility meter. Each utility meter can communicate data describing the consumption of electrical power via PLC network. Each utility meter can communicate the data to the command center application executed at the test server 202 that monitors electrical power consumption at each geographic location.

The workflow server 102 can deploy the testing environment module to a test server 202 in the testing environment. The workflow server 102 can determine that the test server 202 satisfies one or more hardware specifications for the hardware testing profile. For example, the workflow server 102 can communicate with a test server 202 to determine that the test server 202 includes or can emulate the processing capability, memory capability, and storage capabilities specified in the hardware testing profile. The workflow server 102 can install the operating system for the hardware testing profile on the test server 202. The workflow server 102 can install the application on the test server 202. The workflow server 102 can provide a software image including the operating system and application to the test server 202.

The workflow server 102 can deploy the software image including the firmware module to one or more of the test devices 204a-e in the testing environment 106. Deploying the firmware module to the test device can include communicating the firmware module to one or more of the test devices 204a-e via the network 110. One or more of the test devices 204a-e can store the firmware module to a read-only memory unit included in or accessible by the test device. A test device having the firmware module can be rebooted in response to a command from the workflow server 102. Rebooting the test device can cause the test device to access the firmware module from the read-only memory unit and execute the firmware module.

Additional or alternative aspects of the testing environment 106 can include one or more test servers 202 being implemented as virtual servers. A virtual test server can include a virtual server application executed by a test server 202 and emulating the hardware testing profile provided by the workflow server 102.

The workflow server 102 can execute a testing application configured to determine the compatibility of the firmware module with the test devices 204a-e in communication with the test server 202.

Figure 3:
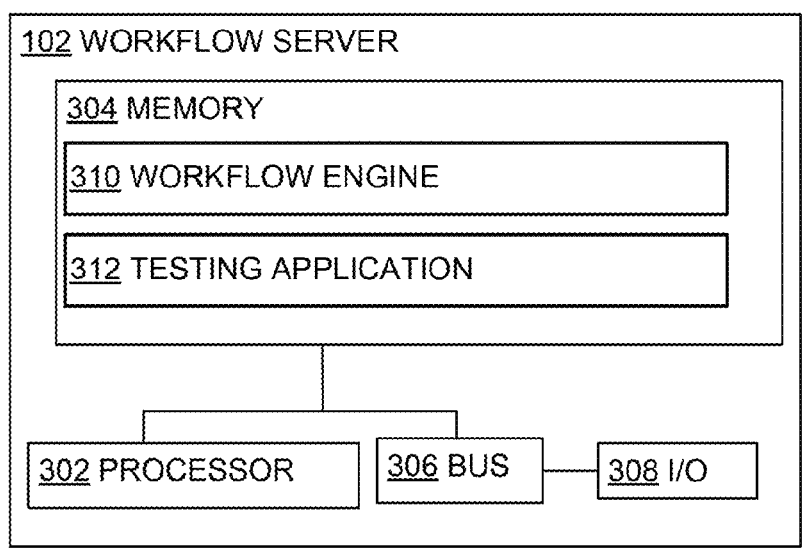
FIG. 3 is a block diagram illustrating an exemplary workflow server of a build-deploy-testing environment.

FIG. 3 is a block diagram illustrating an exemplary workflow server 102 of a build-deploy-testing environment 100.

The workflow server 102 can include a processor 302. The processor 302 can execute code stored on a computer-readable medium, such as a memory 304, to cause the workflow server 102 to control the build-deploy-test cycle of the build-deploy-testing environment 100. Examples of processor 302 include a microprocessor, an application-specific integrated circuit ("ASIC"), a field-programmable gate array ("FPGA"), or other suitable processor. The processor 302 may include one processor or any number of processors.

The processor 302 can access code stored in memory 304 via a bus 306. The memory 304 may be any non-transitory computer-readable medium capable of tangibly embodying code. Examples of a non-transitory computer-readable medium may include (but are not limited to) an electronic, optical, magnetic, or other storage device capable of providing a processor with computer-readable instructions. Other examples include (but are not limited to) a floppy disk, CD-ROM, DVD, magnetic disk, memory chip, ROM, RAM, an ASIC, a configured processor, optical storage, magnetic tape or other magnetic storage, or any other medium from which a computer processor can read instructions.

The bus 306 may be any device capable of transferring data between components of the workflow server 102. The bus 306 can include one device or multiple devices.

Instructions can be stored in the memory 304 as executable code. The instructions can include processor-specific instructions generated by a compiler and/or an interpreter from code written in any suitable computer-programming language, such as C, C++, C#, Visual Basic, Java, Python, Perl, JavaScript, ActionScript, etc.

The instructions can include a workflow engine 310. The workflow engine 310 can configure the processor 302 to execute one or more operations associated with controlling the operation of the build-deploy-testing environment 100. The instructions can also include a testing application 312. The testing application 312 can configure the processor 302 to execute one or more operations associated with testing a firmware module as deployed to a test device in a testing environment 106.

The workflow server 102 can receive input and provide output via an input/output (I/O) interface 308. I/O interface 308 can include, for example, a network interface for communication via the testing environment 106. The workflow server 102 can receive via I/O interface 308 and store in memory 304 inputs such as requests for building a firmware module received from a workstation 108. The workflow engine 310 can also generate instructions for workflow server 102 to provide to the build environment 104 and the testing environment 106 via the I/O interface 308.

This exemplary system configuration is provided to illustrate configurations of certain aspects and feature. Other configurations may of course be utilized.

Figure 4:
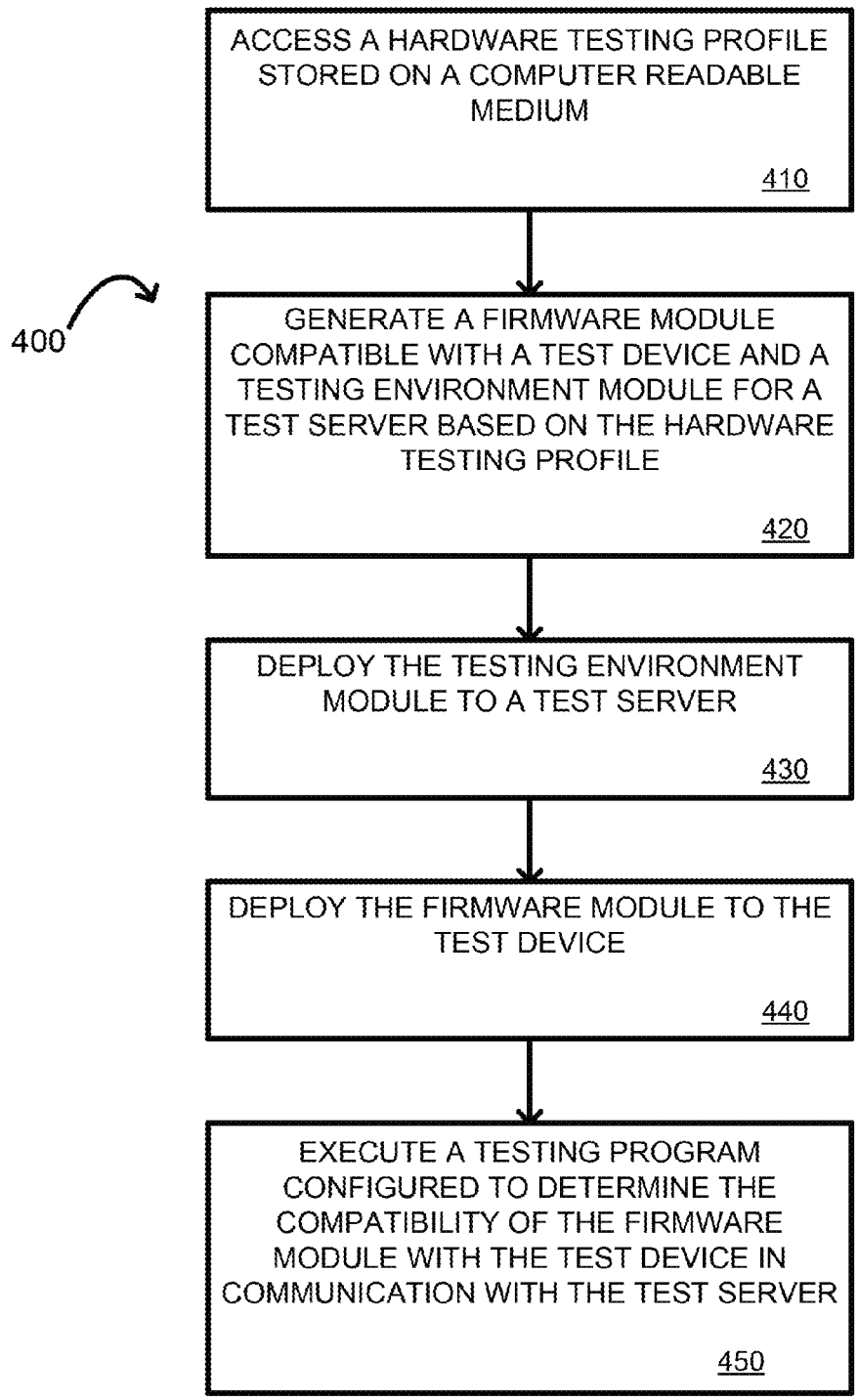
FIG. 4 is a flow chart illustrating an exemplary method of using a decoy cryptographic key to detect an intrusion into a data network.

FIG. 4 is a flow chart illustrating an exemplary method 400 of automating a build-deploy-test cycle in a build-deploy-testing environment 100. For illustrative purposes, the method 400 is described with reference to the system implementation depicted in FIGS. 1-3. Other implementations, however, are possible.

The exemplary method 400 involves accessing a hardware testing profile stored on a computer readable medium, as shown in block 410.

The hardware testing profile can specify one or more hardware specifications associated with a test server 202, an operating system for a test server 202, an application for the test server 202 to communicate with one or more of the test devices 204a-e, and a plurality of inputs to the test server 202 for installing the operating system and the application on the test server 202. Examples of hardware specifications can include (but are not limited to) a memory capacity for a test server 202, a storage capacity for a test server 202, and a processing capability for a test server 202. An example of an application can include one or more software modules configured to communicate with a plurality of network devices via a data network, such as a command center application sued by a server to communicate with utility meters in a PLC network.

The exemplary method 400 further involves generating a firmware module and a testing environment module based on the hardware testing profile, as shown in block 420. The workflow engine 310, executed by the processor 302, can cause the build environment 104 to generate the firmware module and the testing environment module. Generating the firmware module and the testing environment module can include generating one or more executable files having the code for the firmware module and the operating system and applications of the testing environment module.

The exemplary method 400 further involves deploying the testing environment module to a test server 202, as shown in block 430. The workflow engine 310, executed by the processor 302, can cause the workflow server 102 to deploy the testing environment module to the test server 202. Deploying the testing environment module to the test server 202 can include determining that the test server 202 satisfies the one or more hardware specifications, installing the operating system on the test server 202, and installing the application on the test server 202.

In additional or alternative aspects, the workflow server 102 can determine whether a test server 202 having the hardware testing profile exists in the testing environment 106. If such a test server 202 having the hardware testing profile exists in the testing environment 106, the workflow server 102 can omit executing the block 430.

The exemplary method 400 further involves deploying the firmware module to one or more of the test devices 204a-e, as shown in block 440. The workflow server 102 can deploy the firmware module to one or more of the test devices 204a-e by communicating the firmware module to one or more of the test devices 204a-e via the network 110. The test device can store the firmware module to a read-only memory unit included in or accessible by the test device.

The exemplary method 400 further involves executing a testing application 312 configured to determine the compatibility of the firmware module with the test device in communication with the test server 202 having the testing environment module, as shown in block 450. The workflow server 102 can execute the testing application 312.

Executing the testing application 312 can include executing smoke tests for the test device. The smoke tests can determine that the firmware module provides identical functionality for features provided at the test device with a different or previous firmware module. A smoke tests can include two or more feature tests for testing critical functionality across a particular version or versions of a firmware module. A feature test can include two or more functions included in the source code of the firmware module. For example, one or more of the test devices 204a-e receiving the firmware module can be a utility meter. The utility meter may include a feature such as communicating with a test server 202 via an Ethernet data network. A successful smoke test of the utility meter having the firmware module deployed by the workflow server 102 can include the utility meter being able to communicate with a test server 202 via the Ethernet data network. Other examples of smoke tests can include (but are not limited to) testing whether the firmware module can be installed, testing whether additional applications can be installed on the test device, testing whether a read of current meter usage be performed, testing whether a test device can communicate with other test devices, testing whether a test device can acknowledge and response to messages from the test server, testing whether a known set of functions can be executed in a consistent manner, and testing whether the test device executes commands originating from a source using a valid security key or ignores commands originating from a source using an invalid security key.

Executing the testing application 312 can also include evaluating the functionality of a test device for additional features unique to the version of the firmware module deployed to the test device. For example, the testing application 312 can perform a suite test including discrete tests of individual functions of the firmware module as deployed on a test device. The testing application 312 can also perform a regression test including a combination of suite tests and/or smoke tests to determine that the firmware module can properly execute complex functions. A regression tests can include a collection of smoke tests selected to determine a percentage of the total known functionality of a test device or application. For example, a regression test can include two or more smoke tests for evaluating a critical subset of the features of a test device or application.

Additional or alternative aspects of the build-deploy-testing environment 100 can include the build-deploy-testing environment 100 providing the firmware module for additional software testing. For example, the workflow engine 310 can configure the workflow server 102 to store the firmware module as tested by the testing application 312 to a computer readable medium accessible by the workstation 108. The workflow engine 310 can generate a notification message to be provided to the workstation 108 that the firmware module evaluated using the automated testing application 312. A developer can perform additional manual testing of the firmware module evaluated using the automated testing application 312. Executing the testing application 312 can reduce manual testing of the firmware module by testing and fixing firmware modules that would fail for elementary reasons, such as a failure to pass smoke testing, thereby decreasing the amount of time associated with the testing phase of the build-deploy-test cycle and allowing for incremental testing of a firmware module.

Additional or alternative aspects of the build-deploy-testing environment 100 can include the build-deploy-testing environment 100 capturing a hardware testing profile. Capturing a hardware testing profile can include receiving the inputs associated with manually generating the hardware testing profile. The inputs can include any interaction with a test server 202 via an input/output interface. For example, the build-deploy-testing environment 100 can monitor a test server 202 satisfying a set of hardware specification as an operator installs the operating system and the application to the test server 202. The workflow server 102 can store data representing the inputs to a computer-readable medium accessible by the workflow server 102, such as the memory 304. The workflow server 102 can generate the hardware testing profile from the data representing the plurality of inputs. The workflow server 102 can store the hardware testing profile to a library of hardware testing profiles in the build environment 104.

Capturing a hardware testing profile can provide a capability for manually configuring a testing environment a single time and automating configuration and deployment of the testing environment thereafter. The hardware testing profile can provide a recorded and repeatable deployment process that can be executed automatically by the workflow server 102. Executing a repeatable deployment process can reduce errors introduced by manual configuration of hardware in a testing environment 106.

Additional or alternative aspects of the build-deploy-testing environment 100 can include the workflow server 102 having a reporting application for capturing statistics from the build-deploy-test process. The build environment 104 and the testing environment 106 can provide information to the reporting application of the workflow server 102 regarding the time involved with generating a firmware module and testing a firmware module. The build environment 104 and the testing environment 106 can also provide information to the reporting application of the workflow server 102 regarding errors encountered during the build, deploy, and test phases of the build-deploy-test process.

General

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
   accessing, by a processor, a hardware testing profile stored on a computer readable medium;
   generating, by the processor, (i) a firmware module compatible with a utility meter based on the hardware testing profile and (ii) a testing environment module for a test server that is separate from the utility meter based on the hardware testing profile;
   determining, by the processor, that the test server provides an operating system specified in the hardware testing profile and includes or can emulate a hardware limitation specified in the hardware testing profile, wherein the operating system and the hardware limitation support a utility management application specified in the hardware testing profile, wherein the determination is performed based on network communications between the processor and the test server;
   deploying, by the processor, the testing environment module having the utility management application to the test server;
   deploying, by the processor, the firmware module to the utility meter; and
   executing, by the processor, a testing application configured to determine that the firmware module being executed by the utility meter configures the utility meter to properly respond to commands that are generated by the utility management application being executed by the test server and that are received via network communications with the test server.

2. The method of claim 1, wherein the hardware testing profile comprises:
   one or more hardware specifications associated with the test server;
   the operating system for installation on or emulation by the test server;
   the utility management application for the test server to communicate with the utility meter; and
   a plurality of inputs to the test server for installing the operating system and the utility management application on the test server.

3. The method of claim 2, wherein the one or more hardware specifications at least one of a memory capacity, a storage capacity, and a processing capability.

4. The method of claim 2, wherein the utility management application comprises one or more modules configured to communicate with a plurality of power meters.

5. The method of claim 2, wherein the deploying the hardware testing profile to the test server comprises:
   determining that the test server satisfies the one or more hardware specifications;
   installing the operating system on the test server; and
   installing the utility management application on the test server.

6. The method of claim 2, wherein the test server comprises a virtual server and wherein deploying the hardware testing profile to the test server comprises emulating the virtual server satisfying the one or more hardware specifications and having the operating system and the utility management application.

7. The method of claim 2, further comprising, prior to accessing the hardware testing profile:
receiving the plurality of inputs associated with the hardware testing profile;
storing data representing the plurality of inputs; and
generating the hardware testing profile from the data representing the plurality of inputs.

8. The method of claim 1, wherein the firmware module comprises one or more operating instructions for controlling one or more hardware components of the utility meter.

9. The method of claim 8, wherein deploying the firmware module to the utility meter comprises storing the firmware module to a read-only memory unit of the utility meter.

10. The method of claim 8, wherein deploying the firmware module to the utility meter comprises deploying the firmware module via a data network.

11. The method of claim 1, wherein executing the testing application comprises:
executing one or more smoke tests, wherein the one or more smoke tests determine that the firmware module provides identical functionality for one or more features provided at the utility meter with a different firmware module; and
executing one or more suite tests, wherein the one or more suite tests evaluate the functionality of one or more additional features unique to the firmware module.

12. A non-transitory computer-readable medium embodying program code executable by a computer system, the non-transitory computer-readable medium comprising:
program code for accessing a hardware testing profile;
program code for generating a firmware module compatible with a utility meter based on the hardware testing profile and a testing environment module for a test server that is separate from the utility meter based on the hardware testing profile;
program code for determining that the test server provides an operating system specified in the hardware testing profile and includes or can emulate a hardware limitation specified in the hardware testing profile, wherein the operating system and the hardware limitation support a utility management application specified in the hardware testing profile, wherein the determination is performed based on network communications between the processor and the test server;
program code for deploying the testing environment module having the utility management application to the test server;
program code for deploying the firmware module to the utility meter; and
program code for executing a testing application configured to determine that the firmware module being executed by the utility meter configures the utility meter to properly respond to commands that are generated by the utility management application being executed by the test server and that are received via network communications with the test server.

13. The non-transitory computer-readable medium of claim 12, wherein the hardware testing profile comprises:
one or more hardware specifications associated with the test server;
the operating system for installation on or emulation by the test server;
the utility management application for the test server to communicate with the utility meter; and
a plurality of inputs to the test server for installing the operating system and the utility management application on the test server.

14. The non-transitory computer-readable medium of claim 13, wherein the one or more hardware specifications at least one of a memory capacity, a storage capacity, and a processing capability.

15. The non-transitory computer-readable medium of claim 13, wherein the utility management application comprises one or more modules configured to communicate with a plurality of power meters.

16. The non-transitory computer-readable medium of claim 13, wherein the program code for deploying the hardware testing profile to the test server comprises:
program code for determining that the test server satisfies the one or more hardware specifications;
program code for installing the operating system on the test server; and
program code for installing the utility management application on the test server.

17. The non-transitory computer-readable medium of claim 13, wherein the test server comprises a virtual server and wherein the program code for deploying the hardware testing profile to the test server comprises program code for emulating the virtual server satisfying the one or more hardware specifications and having the operating system and the application.

18. The non-transitory computer-readable medium of claim 12, wherein the firmware module comprises one or more operating instructions for controlling one or more hardware components of the utility meter.

19. The non-transitory computer-readable medium of claim 12, wherein the program code for executing the testing application comprises program code for determining that the firmware module provides identical functionality for one or more features provided at the utility meter with a different firmware module and program code for evaluating the functionality of one or more additional features unique to the firmware module.

20. A build-deploy-test environment comprising:
a workflow server system, the workflow server system comprising a processor configured to execute a workflow engine;
a build server system in communication with the workflow server system, the build server system configured to perform operations in response to a command from the workflow engine executed by the workflow server system, the operations comprising:
generating (i) a firmware module for a utility meter based on a hardware testing profile and (ii) a testing environment module for a test server that is separate from the utility meter based on the hardware testing profile, and
determining that the test server provides an operating system specified in the hardware testing profile and includes or can emulate a hardware limitation specified in the hardware testing profile, wherein the operating system and the hardware limitation support a utility management application specified in the hardware testing profile, wherein the determination is performed based on network communications between the processor and the test server; and a testing environment comprising the test server and the utility meter;

wherein the workflow engine comprises one or more modules configured to execute operations comprising:

deploying the testing environment module having the utility management application to the test server, deploying the firmware module to the utility meter, and executing a testing application configured to determine that the firmware module being executed by the utility meter configures the utility meter to properly respond to commands that are generated by the utility management application being executed by the test server and that are received via network communications with the test server.

* * * * *